(12) United States Patent
Yamamoto et al.

(10) Patent No.: US 9,096,776 B2
(45) Date of Patent: Aug. 4, 2015

(54) SILICONE RELEASE COATING COMPOSITION OF CONDENSATION REACTION CURING TYPE

(71) Applicant: Shin-Etsu Chemical Co., Ltd., Tokyo (JP)

(72) Inventors: Kenji Yamamoto, Annaka (JP); Tsutomu Nakajima, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 10 days.

(21) Appl. No.: 13/652,580

(22) Filed: Oct. 16, 2012

(65) Prior Publication Data

US 2013/0096257 A1    Apr. 18, 2013

(30) Foreign Application Priority Data

Oct. 17, 2011   (JP) ................. 2011-227907
Oct. 17, 2011   (JP) ................. 2011-227913

(51) Int. Cl.
*C09D 183/06*   (2006.01)
*C09D 183/04*   (2006.01)
*C08G 77/12*   (2006.01)
*C08G 77/16*   (2006.01)

(52) U.S. Cl.
CPC .............. *C09D 183/04* (2013.01); *C08G 77/12* (2013.01); *C08G 77/16* (2013.01)

(58) Field of Classification Search
CPC ...... C09D 183/04; C08G 77/12; C08G 77/16; C08L 83/04
USPC ....................................................... 524/588
See application file for complete search history.

(56) References Cited

U.S. PATENT DOCUMENTS

| | | | |
|---|---|---|---|
| 2,985,544 A | 5/1961 | de Monterey et al. | |
| 2,985,545 A | 5/1961 | Leavitt | |
| 2,985,546 A | 5/1961 | Leavitt | |
| 3,719,633 A | 3/1973 | Knollmuller et al. | |
| 4,180,462 A | 12/1979 | Bos | |
| 4,433,096 A | 2/1984 | Bokerman et al. | |
| 4,506,058 A * | 3/1985 | Ashby et al. | 524/730 |
| 7,582,788 B2 * | 9/2009 | Roston et al. | 556/415 |
| 8,030,429 B2 | 10/2011 | Sugiura et al. | |
| 8,183,335 B2 | 5/2012 | Maliverney et al. | |
| 2007/0027286 A1 | 2/2007 | Blanc-Magnard et al. | |
| 2007/0219299 A1 | 9/2007 | Okamoto et al. | |
| 2009/0182091 A1 * | 7/2009 | Noro et al. | 524/588 |
| 2011/0040034 A1 | 2/2011 | Maliverney et al. | |
| 2011/0046299 A1 | 2/2011 | Maliverney et al. | |
| 2011/0046304 A1 | 2/2011 | Maliverney | |
| 2011/0098420 A1 * | 4/2011 | Takizawa et al. | 525/477 |
| 2011/0178220 A1 | 7/2011 | Davio et al. | |
| 2011/0248314 A1 | 10/2011 | Takei et al. | |
| 2012/0165421 A1 * | 6/2012 | Maliverney | 521/125 |
| 2012/0172472 A1 * | 7/2012 | Maliverney | 521/134 |

FOREIGN PATENT DOCUMENTS

| | | |
|---|---|---|
| JP | 35-013709 B | 3/1961 |
| JP | 59-176326 A | 10/1984 |
| JP | 2002-80784 A | 3/2002 |
| JP | 2007-9072 A | 1/2007 |
| JP | 2007-527932 A | 10/2007 |
| JP | 2010-163602 A | 7/2010 |
| JP | 2010235786 A * | 10/2010 |
| JP | 2011-506584 A | 3/2011 |
| JP | 2011-506738 A | 3/2011 |
| JP | 2011-506739 A | 3/2011 |
| JP | 2011-506744 A | 3/2011 |
| JP | 2011-510103 A | 3/2011 |
| WO | WO 2005/108498 A1 | 11/2005 |
| WO | WO 2008/081890 A1 | 7/2008 |
| WO | WO 2010/146253 A1 | 12/2010 |
| WO | WO 2010/149870 A1 | 12/2010 |
| WO | WO 2010146253 A1 * | 12/2010 |
| WO | WO 2010149870 A1 * | 12/2010 |

OTHER PUBLICATIONS

English Translation of JP2010-235786 Obtained May 28, 2014 at http://www19.ipdl.inpit.go.jp/PA1/cgi-bin/PA1DETAIL.*
Extended European Search Report issued Feb. 12, 2013, in European Patent Application No. 12188651.9.

* cited by examiner

*Primary Examiner* — Ling Choi
*Assistant Examiner* — Lanee Reuther
(74) *Attorney, Agent, or Firm* — Birch, Stewart, Kolasch & Birch, LLP

(57) ABSTRACT

Disclosed herein is a silicone release coating composition of condensation reaction curing type including: (A) an organopolysiloxane having at least two silanol groups in one molecule; (B) (B-1) an organohydrogenpolysiloxane having at least three SiH groups in one molecule, and/or (B-2) an organopolysiloxane having at least three hydrolyzable groups directly bonded to a silicon atom in one molecule; (C) a compound of metal selected from Mg, Al, Ti, Cr, Fe, Co, Ni, Cu, Zn, Zr, W, and Bi, which functions as a condensation reaction catalyst; and (D) (D-1) a cocatalyst of an organic compound having a bond between a nitrogen atom and an oxygen atom and/or a bond between a nitrogen atom and a sulfur atom through 1 to 3 carbon atoms, or (D-2) a cocatalyst of an organic compound functioning as an oxygen multidentate ligand.

5 Claims, No Drawings

SILICONE RELEASE COATING COMPOSITION OF CONDENSATION REACTION CURING TYPE

CROSS-REFERENCE TO RELATED APPLICATION

This non-provisional application claims priority under 35 U.S.C. §119(a) on Patent Application Nos. 2011-227907 and 2011-227913 filed in Japan on Oct. 17, 2011 and Oct. 17, 2011, respectively, the entire contents of which are hereby incorporated by reference.

TECHNICAL FIELD

The present invention relates to a silicone release coating composition of condensation reaction curing type.

BACKGROUND ART

There has long been known a method for producing a material releasable from sticky substances such as pressure-sensitive adhesive by forming a releasable cured film formed on a surface of a substrate such as paper, laminated paper, and plastic film. The material used for forming the releasable cured film is a silicone composition. For example, a silicone release coating composition of condensation reaction curing type, which is composed of silanol group-containing organopolysiloxane, organohydrogenpolysiloxane, and tin compound, was disclosed in JP-B S35-13709 (Patent Documents 1) and JP-B S36-1397 (Patent Documents 2).

The pioneering material mentioned above was followed by a composition of addition reaction curing type as disclosed in JP-B S46-26798 (Patent Document 3). This new composition soon came into general use on account of its better curability and longer pot life than the old condensation type. The addition curing type is still prevailing especially in the application for release paper which needs curing at a comparatively low temperature within a short time.

The coating composition of condensation reaction curing type mentioned above usually employs a tin compound in the form of alkyl tin which is superior in curing performance, colorless, liquid, and soluble in silicone. Unfortunately, this tin compound is toxic (to reproduction). Moreover, it is pointed out that the tin compound as a suspected environmental hormone is harmful to the environment, and hence there has been a movement to limit the use of the tin compound more strictly.

Despite its disadvantage mentioned above, the coating composition of condensation reaction curing type has advantages of finding use in an area where addition reaction curing type suffers from catalytic poison and of being cable of being used in mixture with a variety of other materials. Therefore, it is expected that the silicone release coating composition of condensation reaction curing type will find use in varied areas if it is relieved from problems with safety of tin catalyst and environmental load.

Consequently, much has been studied for the development of non-tin catalysts. Some examples are listed below:

quaternary phosphonium hydroxide compound, disclosed in JP-A S59-176326 (Patent Document 4);

quaternary ammonium ion compound, disclosed in WO 2008/081890 (Patent Document 5);

organic substance such as guanidine, disclosed in U.S. Pat. No. 3,719,633 (Patent Document 6), U.S. Pat. No. 4,180,462 (Patent Document 7), and JP-T 2011-506584 (Patent Document 8); and natural mineral such as kaolin, disclosed in JP-T 2011-510103 (Patent Document 9).

Conventional metal compounds include titanium and zinc compounds. Recently proposed metal compounds are listed below:

Ir compound, disclosed in JP-T 2007-527932 (Patent Document 10);

Zr compound, disclosed in JP-A 2010-163602 (Patent Document 11);

Zn compound, disclosed in JP-T 2011-506738 (Patent Document 12);

Mo compound, disclosed in JP-T 2011-506744 (Patent Document 13); and various metals such as Cu, Ag, B, Sc, Ce, Bi, Ge, and Mn, disclosed in JP-T 2011-506739 (Patent Document 14).

Such metal catalysts, however, are less common in the industry than tin catalysts because of their slow reaction rate, tendency toward gelation, poor catalytic effect, and high cost. These disadvantages prevent their use especially for the silicone release coating agent which needs curing at a comparatively low temperature within a short time.

CITATION LIST

Patent Document 1: JP-B S35-13709
Patent Document 2: JP-B S36-1397
Patent Document 3: JP-B S46-26798
Patent Document 4: JP-A S59-176326
Patent Document 5: WO 2008/081890
Patent Document 6: U.S. Pat. No. 3,719,633
Patent Document 7: U.S. Pat. No. 4,180,462
Patent Document 8: JP-T 2011-506584
Patent Document 9: JP-T 2011-510103
Patent Document 10: JP-T 2007-527932
Patent Document 11: JP-A 2010-163602
Patent Document 12: JP-T 2011-506738
Patent Document 13: JP-T 2011-506744
Patent Document 14: JP-T 2011-506739

SUMMARY OF INVENTION

It is an object of the present invention to provide a silicone release coating composition capable of curing through condensation reaction involving dehydrogenation and dealcoholization, the composition being designed for coating onto a surface of a paper, a laminated paper and a plastic film and being able to form a non-tacky coating film with good releasability on the surface of various substrates.

In order to achieve the object above, the present inventors conducted a series of researches using a variety of materials. It has been found out that a composition providing good performance as a silicone release coating agent capable of curing through condensation reaction involving dehydrogenation and dealcoholization can be obtained if a non-tin metal compound catalyst is used in combination with a cocatalyst which is a specific nitrogen atom-containing compound or an oxygen multidentate ligand. This finding led to the present invention.

The present invention provides a following condensation reaction-curable silicone release coating composition.

[1] A silicone release coating composition of condensation reaction curing type comprising:

component (A) in an amount of 100 parts by weight which is an organopolysiloxane having at least two silanol groups in one molecule; component (B) which is composed of component (B-1) in an amount of 0.1 to 20 parts by weight which is an organohydrogenpolysiloxane having at least three SiH groups or three hydrogen atoms directly bonded to silicon atoms in one molecule, and/or component (B-2) in an amount of 0.1 to 20 parts by weight which is an organopolysiloxane having at least three hydrolyzable groups directly bonded to a silicon atom in one molecule, with component (B) being in such an amount that the number of moles of SiH groups and hydrolyzable groups as active groups therein is 1 to 200 times the number of moles of silanol amount in component (A);

component (C) in a catalyst quantity which is a compound of metal selected from magnesium, aluminum, titanium, chromium, iron, cobalt, nickel, copper, zinc, zirconium, tungsten, and bismuth, which functions as a condensation reaction catalyst; and component (D) in an amount of 1 to 20 parts by weight which is either component (D-1), which is a cocatalyst of an organic compound having a bond between a nitrogen atom and an oxygen atom and/or a bond between a nitrogen atom and a sulfur atom through 1 to 3 carbon atoms, or component (D-2), which is a cocatalyst of an organic compound functioning as an oxygen multidentate ligand.

[2] The composition of [1], wherein component (D-1) is (I) one which has a molecular weight up to 10,000, (II) one which has a silicon atom-containing substituent in one molecule, or one which satisfies both of the conditions (I) and (II) mentioned above.

[3] The composition of [1] or [2], wherein component (D-1) is one selected from the following organic compounds (i) to (iv) and an organic compound formed by reaction between at least two of the organic compounds (i) to (iv):

(i) an isocyanate group-containing compound and a condensate thereof;

(ii) a reaction product of the isocyanate group-containing compound and a hydroxyl group-containing and/or amino group-containing compound;

(iii) a ring opening reaction product of the amino group-containing compound and an epoxy compound; and (iv) a ring opening reaction product of the amino group-containing compound and an oxetane compound.

[4] The composition of [3], wherein component (D-1) is one of the organic compounds (i) to (iv) which has its oxygen atoms replaced partly or entirely by sulfur atoms and which is used alone or in combination with at least one of the organic compounds (i) to (iv).

[5] The composition of [1], wherein component (D-2) is any one of polybasic carboxylic acid, hydroxy acid, hydroxyketone, diketone, keto acid, and a substituted derivative thereof, which is a cocatalyst of an organic compound capable of functioning as a chelating agent.

[6] The composition of [5], wherein component (D-2) is any one of β-dicarboxylic acid, β-hydroxy acid, β-hydroxyketone, 1,3-diketone, β-keto acid, and a substituted derivative thereof.

[7] The composition of [6], wherein component (D-2) is any one of malonic acid, acetoacetic acid, acetylacetone, and a substituted derivative thereof.

[8] The composition of any one of [1] to [7], wherein the condensation reaction catalyst as component (C) is a compound of trivalent aluminum, trivalent iron, trivalent cobalt, divalent zinc, quadrivalent zirconium, or trivalent bismuth, which has an organic acid, alkoxide, or chelating agent as a ligand bonded thereto.

[9] The composition of [8], wherein the condensation reaction catalyst as component (C) is a compound of trivalent aluminum, trivalent iron, or trivalent bismuth, which has an organic acid or chelating agent as the ligand bonded thereto.

[10] The composition of [8], wherein the condensation reaction catalyst as component (C) is a compound of trivalent aluminum or trivalent iron, which has a multidentate ligand bonded thereto to be selected from organic acid having 5 to 20 carbon atoms and/or malonic acid, acetoacetic acid, acetylacetone, and a substituted derivative thereof.

[11] The composition of any one of [1] to [10], further comprising an organic solvent as component (E).

[12] The composition of any one of [1] to [11], wherein, when components (A) to (D) are dissolved in 1,900 parts by weight of toluene at the above-defined ranges of the blending amounts, a resulting solution has a viscosity up to twice its initial viscosity after standing at 25° C. for 24 hours.

Advantageous Effects of Invention

According to the present invention, even when using a non-tin metal compound catalyst which is generally inferior in curability and releasability to a tin compound catalyst, excellent curability and releasability can be accomplished. Moreover, the present invention provides a condensation reaction curable silicone release coating composition which is free of tin compounds involving potential problems with safety and environmental pollution. This composition is therefore expected to find new use in areas where an addition reaction curable silicone composition involves difficulties in application. It will also find new use because of its capability of mixing with a variety of materials.

The composition of the present invention forms a cured coating film which firmly adheres to a variety of substrates. It is also superior in shelf life and pot life as well as workability and stability in properties.

DESCRIPTION OF EMBODIMENTS

Component (A): Organopolysiloxane

Component (A) is an organopolysiloxane having at least two hydroxyl groups each of which is directly bonded to a silicon atom in one molecule. The organopolysiloxane may have monovalent organic groups (other than the hydroxyl groups directly bonded to the silicon atoms) without specific restrictions. Such monovalent organic groups include, for example, alkyl groups (such as methyl group, ethyl group, propyl group, and butyl group), cycloalkyl groups (such as cyclopentyl group and cyclohexyl group), aryl groups (such as phenyl group and naphthyl group), and alkenyl groups (such as vinyl group and propenyl group), which are monovalent hydrocarbon groups having 1 to 10 carbon atoms. In the present invention, the organopolysiloxane should preferably contain organic groups other than the hydroxyl groups such that methyl group accounts for at least 80 mol % in them. In addition, the organopolysiloxane is not specifically restricted in molecular structure; however, a straight chain structure is basically desirable from the industrial point of view although a branched chain structure is also acceptable.

The organopolysiloxane as component (A) should preferably be one whose 30 wt % solution in toluene has an absolute viscosity of at least 50 mPa·s, more preferably 50 to 100,000 mPa·s, measured at 25° C. using a rotary viscometer.

Typical examples of component (A) are organopolysiloxanes represented by formulas (1-1) and (1-2) below, in which R is any one of hydroxyl groups, alkyl groups (such as methyl group, ethyl group, propyl group, and butyl group), cycloalkyl groups (such as cyclopentyl group and cyclohexyl group), aryl groups (such as phenyl group and naphthyl group), and alkenyl groups (such as vinyl group and propenyl group). R is also, in addition to monovalent hydrocarbon groups having 1 to 10 carbon atoms defined above, a siloxane residue represented by structural formulas (2-1) and (2-2), in which $R^1$ is an oxygen atom or one of alkylene groups having 1 to 6 carbon atoms (such as methylene group and ethylene group) and R is defined as above. In the formulas (1-1), (1-2), (2-1), and (2-2), $\alpha 1$ is 0 to 1,000, particularly 0 to 900, $\beta 1$ is 50 to 9,000, particularly 60 to 9,000, $\alpha 2$ is 0 to 900, and $\beta 2$ is 0 to 9,000. These numbers should be adequately selected so that there exist at least two hydroxyl groups in one molecule.

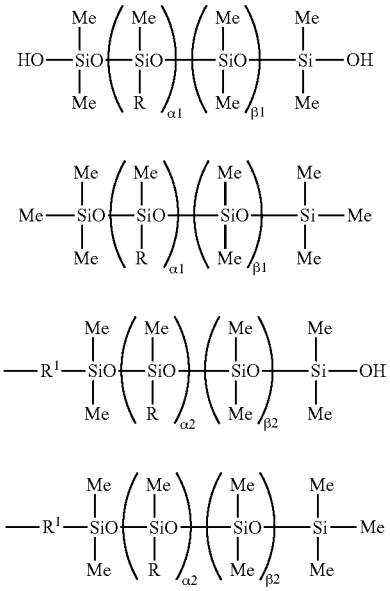

(1-1)

(1-2)

(2-1)

(2-2)

(In the formulas above, Me is methyl group.)

Component (B-1): Organohydrogenpolysiloxane

Component (B-1) which is used as component (B) in the present invention is an organohydrogenpolysiloxane having at least three, preferably 4 to 1,000, hydrogen atoms directly bonded to silicon atoms (i.e., SiH groups) in one molecule. Except for this limitation, it may have any molecular structure of straight-chain type, branched chain type, or cyclic type. It is only necessary that the organohydrogenpolysiloxane as component (B-1) in the present invention is one which has an absolute viscosity ranging from several mPa·s to several tens of thousands of mPa·s measured at 25° C. using a rotary viscometer.

Typical examples of the organohydrogenpolysiloxanes are shown below.

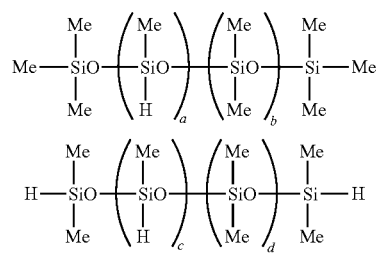

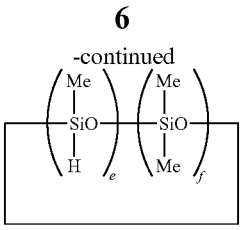

-continued

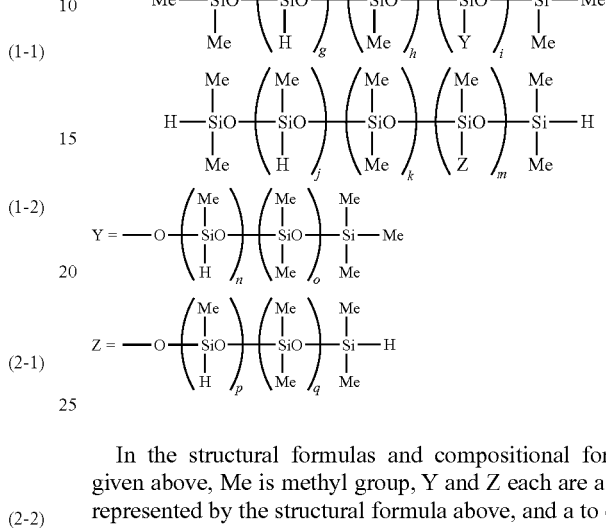

In the structural formulas and compositional formulas given above, Me is methyl group, Y and Z each are a group represented by the structural formula above, and a to q each are an integer in a range specified below.

a, e, g: 3 to 500, particularly 4 to 500
f, i, m: 0 to 500, particularly 0 to 400
b, c, d, h, j, k, n, o, p, q: 0 to 500, particularly 0 to 400

Component (B-2): Hydrolyzable Group-Containing Organopolysiloxane

Component (B-2) in the present invention is an organopolysiloxane which has at least three, preferably 3 to 1,000, hydrolyzable groups bonded to silicon atoms in one molecule. The hydrolyzable groups include alkoxy groups (such as methoxy group, ethoxy group, propoxy group, butoxy group, methoxyethoxy group, and isopropenoxy group) and acyloxy groups (such as acetoxy group), which are directly bonded to silicon atoms. The hydrolyzable groups may also partly include those which contain amino groups (such as ethylamino group), amide groups, oxime groups (such as ethylmethylbutanoxime group), or halogen atoms (such as chlorine atom and bromine atom).

Methoxy group, ethoxy group, propoxy group, and butoxy group are desirable as hydrolyzable groups from the standpoint of industry. Typical examples of organopolysiloxanes are represented by formulas below, in which r is 0 to 200, particularly 0 to 190, s is 0 to 1,000, particularly 0 to 900, Me is methyl group, and Et is ethyl group.

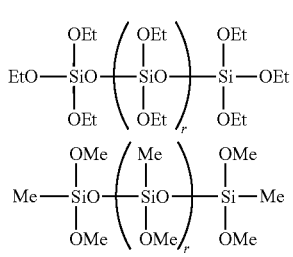

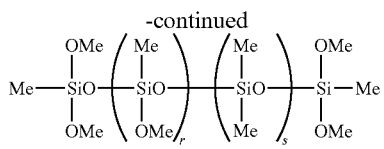

Incidentally, alkoxy groups may be partly replaced by such groups as $CH_3COO—$, $CH_3(C_2H_5)C=NO—$, $(C_2H_5)_2N—$, $CH_3CO(C_2H_5)N—$, and $CH_2=(CH_3)CO—$.

The amount of organohydrogenpolysiloxane as component (B-1) of component (B) should be such that the amount (in terms of moles) of hydrogen atoms bonded to contained silicon atoms is 1 to 200 times, particularly 1 to 190 times, the total amount (in terms of moles) of hydroxyl groups contained in component (A). The hydrogen atoms bonded to the silicon atoms will be referred to as SiH group hereinafter. The amount of organopolysiloxane as component (B-2) of component (B) should be such that the amount (in terms of moles) of hydrolyzable groups bonded to silicon atoms is 1 to 200 times, particularly 1 to 190 times, the total amount (in terms of moles) of hydroxyl groups contained in component (A). If the amount of active groups (SiH groups and hydrolyzable groups) contained in component (B) is less than the lower limit mentioned above, the resulting silicone composition for release coating will be poor in curability. By contrast, the amount in excess of the upper limit is uneconomically wasted without any additional prominent effect and is detrimental to storage stability. The amount of component (B) should usually be 0.1 to 30 parts by weight, particularly 0.1 to 29 parts by weight, for 100 parts by weight of organopolysiloxane as component (A). Component (B) may be component (B-1) alone, component (B-2) alone, or a combination of components (B-1) and (B-2). It is also possible to use one which contains both SiH groups and hydrolyzable groups in one molecule.

Component (C): Curing Catalyst

The composition according to the present invention employs a curing catalyst as component (C). The catalyst is a condensation reaction curing catalyst intended to promote a so-called crosslinking reaction between component (A) and component (B), thereby forming a cured coating film. A compound of a metal selected from magnesium, aluminum, titanium, chromium, iron, cobalt, nickel, copper, zinc, zirconium, tungsten, and bismuth can be used as the condensation reaction curing catalyst. Preferable examples of the compounds include organic acid salts of trivalent aluminum, trivalent iron, trivalent cobalt, divalent zinc, quadrivalent zirconium, or trivalent bismuth, and metal compounds in the form of alkoxide or chelate. The organic acid salts include salts of octylic acid, lauric acid, and stearic acid. Alkoxide includes propoxide and butoxide, and chelate compounds include conjugate base of catechol, crown ether, polybasic carboxylic acid, hydroxy acid, and esters thereof, conjugate base of 1,3-diketone, conjugate base of β-keto acid ester, as well as multidentate ligand chelate compound. Different kinds of ligands may be bonded to one metal atom.

Compounds of aluminum, iron, and bismuth are easy to use and preferable because they often enable stable curing despite variation in compounding and working conditions.

Especially in a case where an organic compound is used which can function as component (D-2), which is an oxygen multidentate ligand mentioned later as a cocatalyst, the above-mentioned aluminum compound and iron compound are easy to use and desirable because of their stable curability insensitive to varied compounding and working conditions. Further preferable structures include trivalent chelate compound of aluminum or iron in which the multidentate ligand is malonic acid ester, acetoacetic acid ester, acetylacetone, or substituted derivative thereof. In addition, in the metal compound of trivalent aluminum or trivalent iron, an organic acid having 5 to 20 carbon atoms such as octylic acid can be preferably used, and the above-described multidentate ligand and organic acid may be bonded to one metal atom.

The substituted derivative mentioned above may be one in which a hydrogen atom contained in the compound mentioned above is replaced by any one of alkyl groups (such as methyl group and ethyl group), alkenyl groups (such as vinyl group and allyl group), aryl groups (such as phenyl group), halogen atoms (such as chlorine atom and fluorine atom), hydroxyl group, fluoroalkyl groups, ester group-containing group, ether-containing group, ketone-containing group, amino group-containing group, amide group-containing group, carboxylic acid-containing group, nitrile group-containing group, and epoxy group-containing group. Typical examples include 2,2,6,6-tetramethyl-3,5-heptanedione and hexafluoropentanedione.

The above-described condensation reaction curing catalyst may be used in a catalyst quantity, which ranges from 0.1 to 20 wt % (in terms of metal) for component (A) and can be arbitrarily determined depending on the curing conditions.

Component (D): Cocatalyst

According to the present invention, component (D) of the composition is a cocatalyt which is incorporated to improve the catalytic action of component (C). Component (D) is either component (D-1) or component (D-2). Component (D-1) is an organic compound constructed such that a nitrogen atom is bonded to an oxygen atom and/or sulfur atom through 1 to 3 carbon atoms. Component (D-2) is an organic compound which functions as the oxygen multidentate ligand.

When the bond is made through one carbon atom, this structure is represented by —O—C—N—, whose typical examples include cyanate group —O—C≡N, trimer thereof known as cyanurate group, isocyanate group —N=C=O, dimer and timer thereof known as urethodione group and isocyanurate group, respectively, amide group —CO—NH—, carbamate group —O—CO—NH$_2$, urethane group —O—CO—NH—, urea group —NH—CO—NH—,

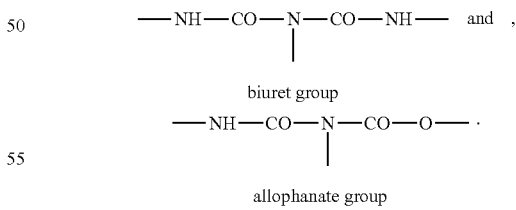

They may assume a cyclic structure as exemplified by cyclic iminoether (such as oxazoline, oxazole, and oxazine), cyclic imide (such as maleimide and phthalimide), and cyclic lactam (such as pyrrolidone). Preferable among these examples are those compounds derived from isocyanate groups. Other preferable compounds are their dimers, trimers, compounds derived therefrom, and products resulting from their reaction with a hydroxyl group- and/or amino group-containing compound.

Examples of the compound having a structure —O—C—C—N— include those compounds derived from ethanolamine. Ring-opening reaction between an amino group-containing compound and an epoxy compound is made by applying a production method of ethanolamine in which amine and ethylene oxide are reacted with each other, whereby various compounds having corresponding structures can be prepared.

Examples of the compound having a structure —O—C—C—C—N— include those compounds derived from 1,3-aminoalcohol. Ring-opening reaction between an amino group-containing compound and an oxetane compound is made by applying a production method of 1,3-aminoalcohol in which amine and oxetane are reacted with each other, whereby various compounds having corresponding structures can be prepared.

Component (D-1) may also include any organic compound which results from reaction between at least two of the above-mentioned compounds.

The compounds may have oxygen atoms (O) therein partly or entirely replaced by sulfur atoms (S). Such compounds may be prepared by using isothiocyanate, thiacyclopropane or thietane.

The compound as component (D-1) may be either or both of a first compound having a structure in which nitrogen atoms and oxygen atoms are bonded through carbon atoms and a second compound differing from the first one in that the oxygen atoms are partly or entirely replaced by sulfur atoms.

Moreover, component (D-1) is required to be readily soluble in the silicone composition of the present invention. This solubility depends on the structure and molecular weight of the compound. The higher the molecular weight, the poorer the solubility is. A desirable molecular weight is up to 10,000, particularly up to 5,000. The molecular weight given hereunder is the number-average molecular weight determined under the following conditions by gel permeation chromatography (GPC) that employs polystyrene as the reference substance.

[Measurement Conditions]
Developer: toluene
Flow rate: 0.35 mL/min
Detector: differential refractive index detector (RI)
Column: TSKgel-G2000H×2, G3000H×1, G4000H×1, TSKguardcolumnH-L×1 (made by Tosoh Corp.)
Column temperature: 40° C.
Amount of sample injected: 20 μL (1 wt % toluene solution)

Incidentally, those compounds having Si atom-containing substituents in the molecule are desirable because of their good solubility. Examples of such substituents include silyl and siloxane groups represented by $-SiR^1_m(OR^2)_{3-m}$, $-O-SiR^1_m(OR^2)_{3-m}$, or $-(SiR^1_o(OR^2)_{2-o}-O-)_n-SiR^1_m(OR^2)_{3-m}$, in which $R^1$ and $R^2$ each are an alkyl group, alkenyl group, or aryl group having 1 to 20 carbon atoms, particularly 1 to 10 carbon atoms, (such as methyl group, ethyl group, propyl group, butyl group, pentyl group, hexyl group, vinyl group, allyl group, propenyl group, butenyl group, and phenyl group), and m, n, and o are respectively 0 to 3, 1 to 10, and 0 to 2. These groups may exist in the molecule in the form of divalent (or polyvalent) substituent in which part of $R^1$ and $R^2$ function as bonds.

Component (D-1) should preferably be selected from those organic compounds defined in paragraphs (i) to (iv) below or those organic compounds which are obtained by reaction between at least two of the organic compounds below:

(i) an isocyanate group-containing compound and a condensate thereof;

(ii) a reaction product of the isocyanate group-containing compound and a hydroxyl group-containing and/or amino group-containing compound;

(iii) a ring opening reaction product of the amino group-containing compound and an epoxy compound; and (iv) a ring opening reaction product of the amino group-containing compound and an oxetane compound.

Typical examples of component (D-1) in the present invention are represented by following formulas in which Me is methyl group and Et is ethyl group.

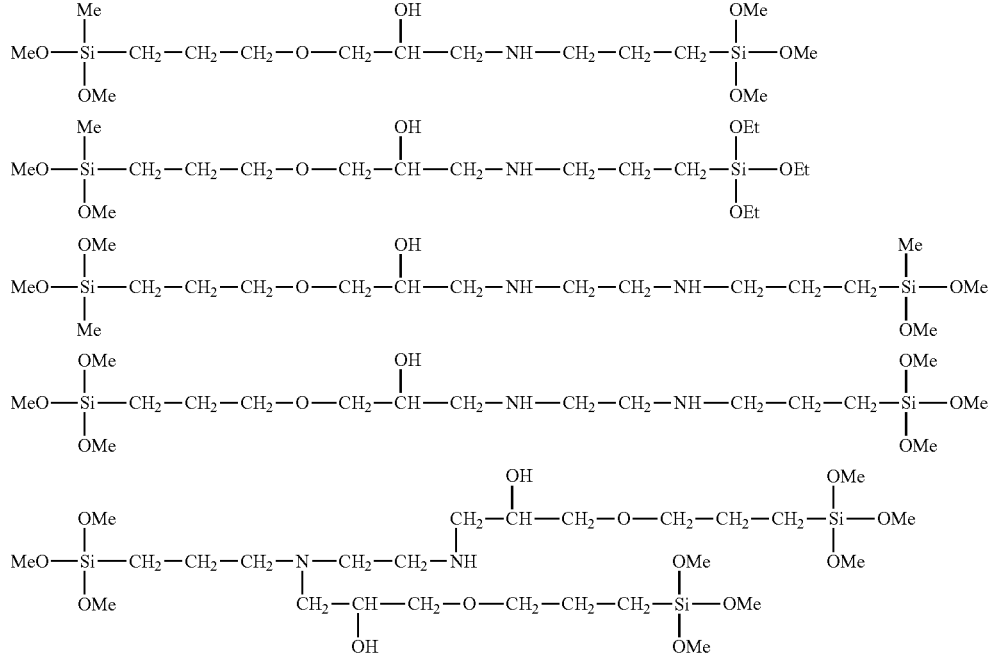

-continued

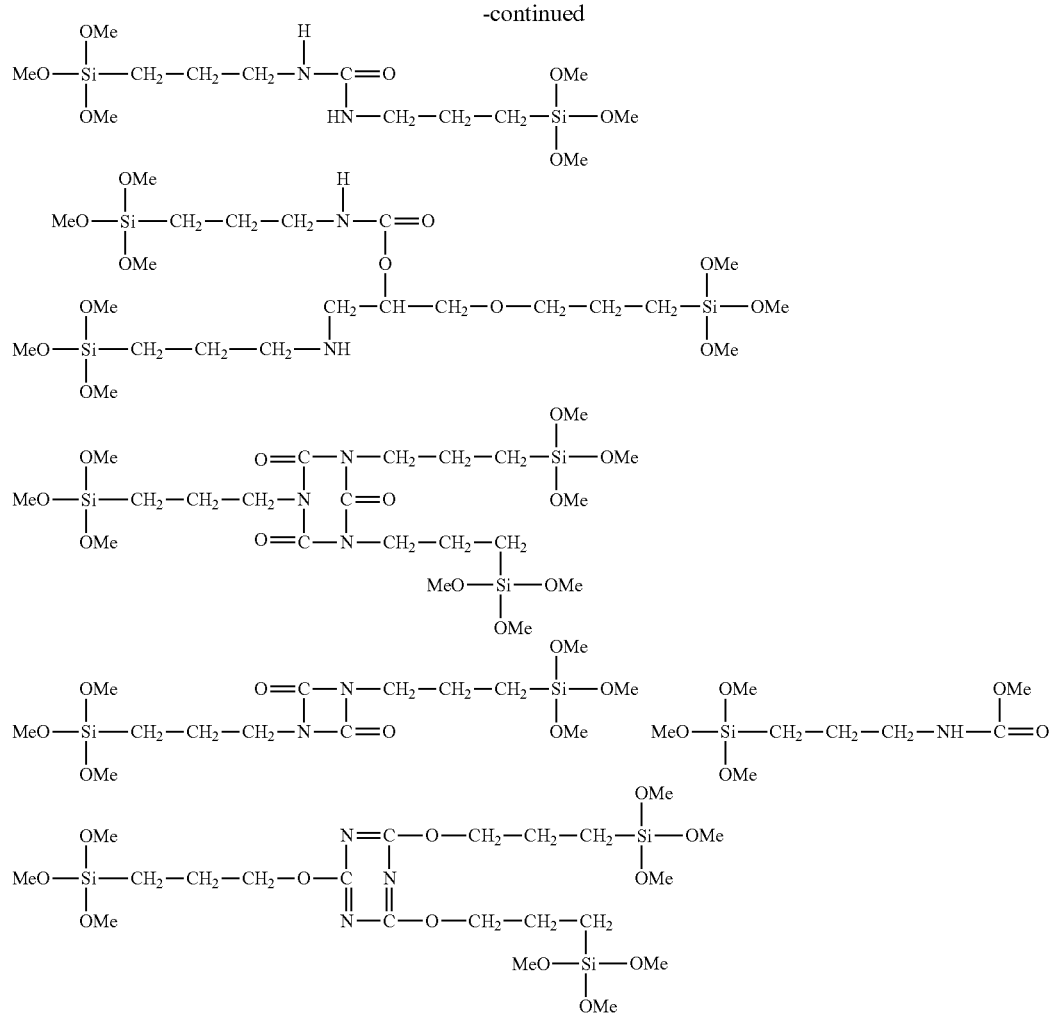

On the other hand, component (D-2) is an organic compound which functions as the oxygen multidentate ligand typified by such compounds as polybasic carboxylic acid, hydroxy acid, hydroxyketone, diketone, keto acid, and substituted derivatives thereof. Preferable among these compounds are dicarboxylic acid, β-hydroxy acid, 1,3-diketone, β-keto acid, β-hydroxyketone, and substituted derivatives thereof. Their specific examples include malonic acid, acetoacetic acid, acetylacetone, and substituted derivatives thereof. Examples of the substituted derivatives include those derived from the above-mentioned compounds which have hydrogen atoms therein replaced by alkyl groups (such as methyl group and ethyl group), alkenyl groups (such as vinyl group and allyl group), aryl groups (such as phenyl group), acyl groups (such as benzoyl group), halogen atoms (such as chlorine atom and fluorine atom), hydroxyl group, fluoroalkyl groups, ester group-containing group, ether-containing group, ketone-containing group, amino group-containing group, amide group-containing group, carboxylic acid-containing group, nitrile group-containing group or epoxy group-containing group. Their specific examples include ethyl acetoacetate, 2,2,6,6-tetramethyl-3,5-heptanedionate, hexafluoropentanedionate, and benzoylacetoacetate. Particularly preferable among them are acetyl-acetone and their substituted derivative (such as 2,2,6,6-tetramethyl-3,5-heptanedione).

Although no elucidation has been made yet of the mechanism by which component (D-2) functions as a cocatalyst, it is assumed that aluminum or iron constituting the metal compound as component (C) easily reacts with ambient water to form hydroxides and such compounds contained as impurities or formed during use deteriorate the catalytic effect on account of their poor solubility. By the presence of component (D-2), it is considered that the oxygen multidentate ligand replaces hydroxyl group, thereby converting into a structure with high catalytic effect.

Another assumption is as follows. In a case where component (C) has a chelate compound as a ligand, the chelate compound (as the multidentate ligand) crosslinks at least two metal atoms, thereby forming a structure of high molecular weight. When components having such a structure increase, solubility is lowered and catalytic actions are deteriorated. This adverse effect, too, is counteracted by component (D-2) which disintegrates the crosslinking structure of metal atoms to give a new structure favorable for catalytic action.

According to the present invention, the cocatalyst as component (D) should be added in an amount of 1 to 20 parts by weight, preferably 1 to 19 parts by weight, for 100 parts by weight of component (A). With an amount less than the lower limit, the resulting composition will be poor in curability. With an amount more than the upper limit, the resulting composition will be poor in pot life and workability.

Component (E): Organic Solvent

An organic solvent as component (E) of the composition according to the present invention is incorporated for the purposes of good stability in a processing bath, good applicability to various substrates and adequate adjustment of coating weight and viscosity. Examples of the solvent include toluene, xylene, ethyl acetate, acetone, methyl ethyl ketone, ethanol, IPA, hexane, and heptane. They are used in any amount suitable for uniform dissolution of the composition. An adequate amount of component (E) is 10 to 1,900 parts by weight for 100 parts by weight of component (A). Component (E) may be omitted for some coating methods.

Component (F): Organic Compound Having Such a Structure that a Nitrogen Atom and an Oxygen Atom are Bonded Together Through a Carbon Atom An organic compound having such a structure that a nitrogen atom (N) and an oxygen atom (O) are bonded together through 1 to 3 carbon atoms (C) may be incorporated in the composition according to the present invention. This organic compound is expected to increase the strength of the cured coating film and improve adhesion with the substrate. It includes, for example, compounds having an isocyanate group —N=C=O and derivatives thereof and compounds obtained by ring-opening reaction between an amino group-containing compound and an epoxy or oxetane compound. Preferable among them is one which additionally has a substituent group containing silicon (Si).

Typical examples of component (F) are shown below.

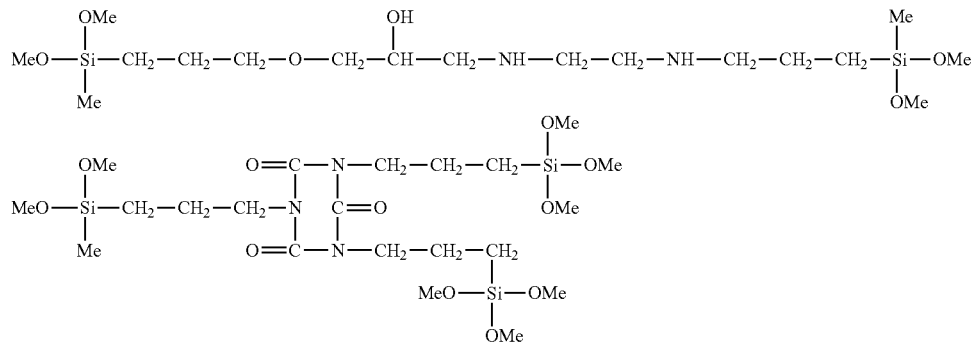

The amount of component (F), if it is added, should be 1 to 20 parts by weight, preferably 1 to 19 parts by weight, for 100 parts by weight of component (A). Incidentally, component (F) is effective particularly in a case where the composition contains component (D-2) as the cocatalyst.

Additional Components

The composition according to the present invention may optionally be incorporated with any known additives such as slip agent, adhesion promoter, release control agent, pigment, leveling agent, and bath life extender as appropriate.

The composition according to the present invention may be readily produced by uniformly mixing components (A), (B), (C), and (D) mentioned above, optionally in combination with components (E) and (F) mentioned above. It is desirable to start the procedure by uniformly dissolving component (A) in component (E) and then mixing the resulting solution sequentially with components (B), (C), (D), and (F).

The composition according to the present invention is superior in pot life to the conventional one of condensation reaction curing type because it contains no tin catalyst. However, it should preferably be incorporated with component (C) immediately before coating so that it has a sufficiently long pot life.

The composition according to the present invention will be desirable from the standpoint of pot life and workability if it has a viscosity up to twice its initial viscosity when measured with a rotary viscometer after mixing with 1,900 parts by weight of toluene as component (E) and standing for 24 hours at 25° C.

The composition according to the present invention may be applied to such a substrate as paper, laminated paper, and plastic film, directly or after dilution with an adequate organic solvent, by any known coating method with a bar coater, roll coater, reverse coater, gravure coater, or air knife coater. Accurate thin film coating may be accomplished with an offset coater or multistage roll coater.

The composition according to the present invention may vary in coating weight depending on the type of the substrate. An adequate coating weight is 0.1 to 5.0 g/m² (in terms of solids). The coated substrate thus obtained is heated at 80 to 180° C. for 5 to 60 seconds so that the composition forms a cured film on the surface of the substrate. In this way there is obtained a release paper or release film as desired.

EXAMPLES

The invention will be described below in more detail with reference to Examples and Comparative Examples, which are not intended to restrict the scope thereof. Abbreviations Me and Et are methyl group and ethyl group, respectively, hereunder.

Example 1

First, component (A), which is 100 parts by weight of organopolysiloxane having a main skeleton composed of dimethylsiloxane units and having both ends of the molecular chain blocked with dimethylhydroxysilyl groups, characterized by that its 30 wt % solution in toluene has a viscosity of 10,000 mPa·s (measured with a rotary viscometer at 25° C.), was dissolved with stirring at 20 to 40° C. in component (E), which is 1,800 parts by weight of toluene. To the resulting solution was added components (B-1) and (D-1) with stirring at 20 to 40° C. for one hour. Component (B-1) is three parts by weight of methylhydrogenpolysiloxane composed of MeHSiO$_{2/2}$ units (95 mol %) and having both ends of the molecular chain blocked with trimethylsilyl groups, characterized by an absolute viscosity of 25 mPa·s. Component (D-1) is ten parts by weight of a compound represented by a formula below.

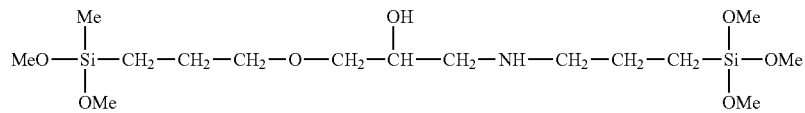 [SMILES: CO[Si](C)(CCCOCC(O)CNCCC[Si](OC)(OC)OC)OC]

Incidentally, component (D-1) was obtained from compounds represented by formulas below by reaction in equal molar amounts at 140° C. for six hours. It is composed mainly of a condensate of epoxy group and amino group, and it has an average molecular weight of 400.

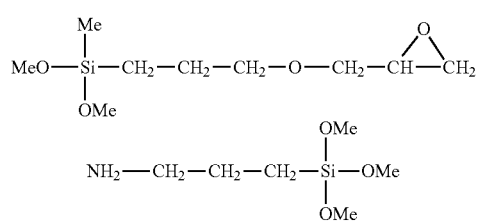

Immediately before application to a substrate, the desired composition was prepared by incorporating the above-described mixture with component (C), which is trivalent bismuth carboxylate, in an amount of 3 wt % in terms of bismuth for 100 wt % of component (A).

The thus obtained composition was uniformly applied to glassine paper by using a mayer bar, followed by curing under predetermined conditions (at 150° C. for 30 seconds). In this way there was obtained a sample for evaluation which has a coating weight of 1.0 g/m² (in terms of solids). The cured coating film was evaluated for characteristic properties according to a method mentioned later. The results of the evaluation are shown in Table 1.

Example 2

The same composition as in Example 1 was prepared except that component (D-1) was replaced by ten parts by weight of a compound represented by a formula below.

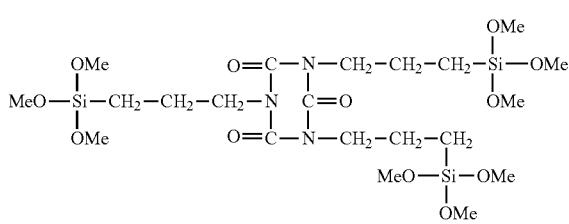 [SMILES: CO[Si](CCCn1c(=O)n(CCC[Si](OC)(OC)OC)c(=O)n(CCC[Si](OC)(OC)OC)c1=O)(OC)OC]

Incidentally, component (D-1) was prepared from a compound represented by a formula below through condensation of three moles of isocyanate groups therein in a known way. It is a trimer having an average molecular weight of 600.

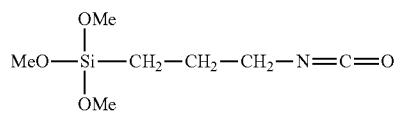

Example 3

The same composition as in Example 1 was prepared except that component (D-1) was replaced by ten parts by weight of a compound represented by a formula below.

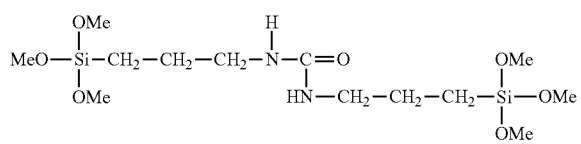 [SMILES: CO[Si](CCCNC(=O)NCCC[Si](OC)(OC)OC)(OC)OC]

Incidentally, component (D-1) was obtained from compounds represented by formulas below by reaction in equal molar amounts at 50° C. for six hours. It is composed mainly of a condensate of isocyanate group and amino group, and it has an average molecular weight of 350.

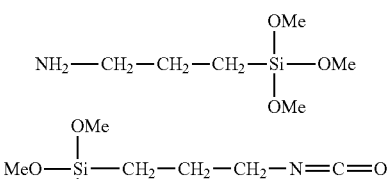

Example 4

The same composition as in Example 1 was prepared except that component (D-1) was replaced by ten parts by weight of a compound represented by a formula below.

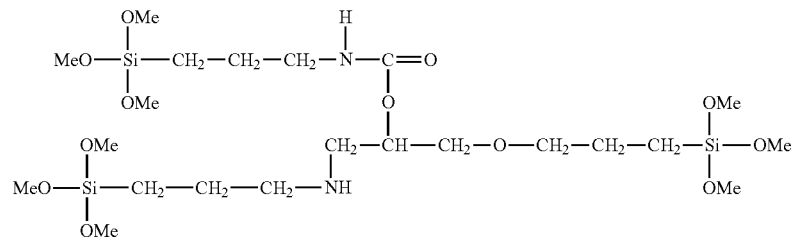 [SMILES: CO[Si](CCCNCC(COCCC[Si](OC)(OC)OC)OC(=O)NCCC[Si](OC)(OC)OC)(OC)OC]

Incidentally, component (D-1) was obtained from one mole each of compounds represented by formulas below.

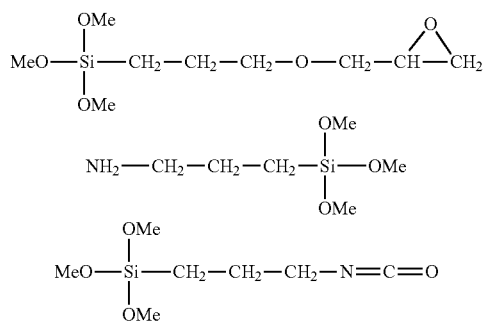

The first and second compounds were reacted with each other at 140° C. for six hours and the resulting intermediate compound was reacted with the third compound at 50° C. for six hours. The thus obtained compound has an average molecular weight of 600.

Example 5

The same composition as in Example 1 was prepared except that component (D-1) was replaced by ten parts by weight of a compound represented by a formula below.

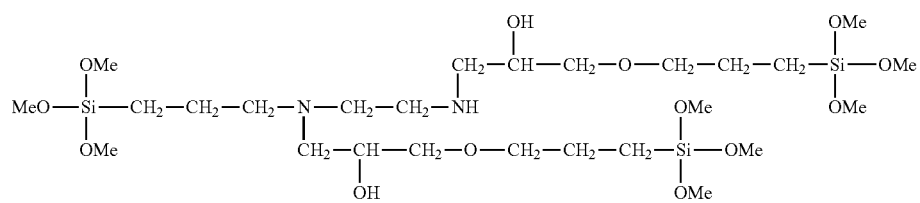 [SMILES: CO[Si](CCCOCC(O)CNCCN(CCC[Si](OC)(OC)OC)CC(O)COCCC[Si](OC)(OC)OC)(OC)OC]

Incidentally, component (D-1) was obtained from one mole of a compound represented by a formula below

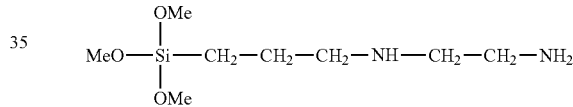

and two moles of a compound represented by a formula below

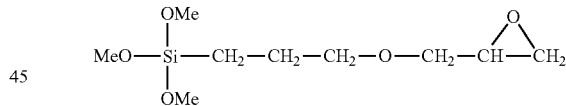

by reaction at 140° C. for six hours. The thus obtained compound has an average molecular weight of 700.

Example 6

The same composition as in Example 1 was prepared except that component (D-1) was replaced by ten parts by weight of a compound represented by a formula below.

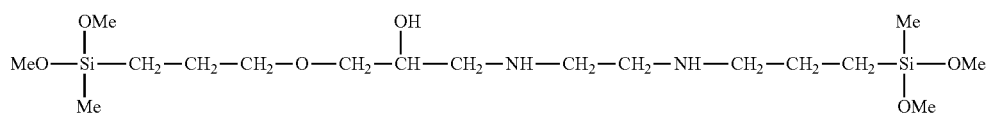 [SMILES: CO[Si](C)(CCCNCCNCC(O)COCCC[Si](C)(OC)OC)OC]

Incidentally, component (D-1) was obtained from one mole each of compounds represented by formulas below

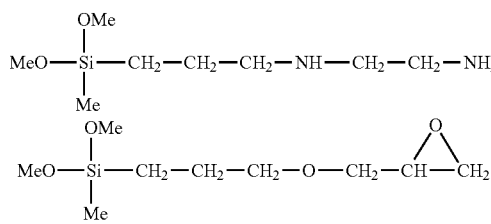

by reaction at 140° C. for six hours. The thus obtained compound has an average molecular weight of 400.

Example 7

The same procedure as Example 1 was carried out except that component (C) was replaced by iron tetraacetylacetonate in an amount of 3 wt % in terms of iron for 100 wt % of component (A).

Example 8

The same procedure as in Example 1 was carried out except that component (A) was replaced by another component (A) specified below and component (B-1) was replaced by component (B-2) specified below.
Component (A) for Replacement:
100 parts by weight of organopolysiloxane having a main skeleton composed of dimethylsiloxane units (99.9 mol %) and blocked at both ends of the molecular chain with dimethylhydroxysilyl groups and also having hydroxymethylsiloxane units (0.01 mol %), characterized by that its 30 wt % solution in toluene has a viscosity of 15,000 mPa·s at 25° C.
Component (B-2):
five parts by weight of methylmethoxypolysiloxane which is a partial hydrolyzate condensate of MeSi(OMe)$_3$ and has a viscosity of 10 mPa·s.

Example 9

The same procedure as in Example 8 was carried out except that component (C) was replaced by another component (C) which is aluminum tetraacetylacetonate in an amount of 3 wt % (in terms of aluminum) for 100 wt % of component (A).

Example 10

The same procedure as in Example 8 was carried out except that component (C) was replaced by another component (C) which is iron tetraacetylacetonate in an amount of 3 wt % (in terms of iron) for 100 wt % of component (A).

Example 11

The same procedure as in Example 8 was carried out except that component (C) was replaced by another component (C) which is composed of aluminum tetraacetylacetonate in an amount of 1.5 wt % (in terms of aluminum) and trivalent bismuth carboxylate in an amount of 1.5 wt % (in terms of bismuth), both for 100 wt % of component (A).

Example 12

The same procedure as in Example 8 was carried out except that component (C) was replaced by another component (C) which is composed of iron tetraacetylacetonate in an amount of 1.5 wt % (in terms of iron) and trivalent bismuth carboxylate in an amount of 1.5 wt % (in terms of bismuth), both for 100 wt % of component (A).

Comparative Example 1

The same procedure as in Example 1 was carried out to prepare a sample for evaluation, except that component (D-1) was not added.

Comparative Example 2

The same procedure as in Example 1 was carried out to prepare a composition, except that component (D-1) was replaced by a compound represented by a formula below.

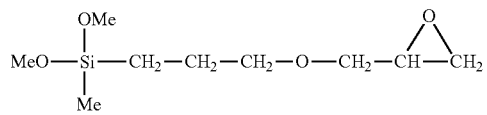

Comparative Example 3

The same procedure as in Example 1 was carried out to prepare a composition, except that component (D-1) was replaced by a compound represented by a formula below.

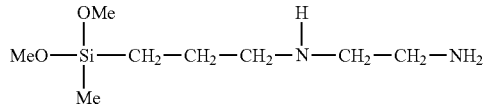

Comparative Example 4

The same procedure as in Example 1 was carried out to prepare a composition, except that component (D-1) was not added and component (C) was replaced by dioctyltin dicarboxylate in an amount of 3 wt % in terms of tin.

Comparative Example 5

The same procedure as in Example 8 was dioctyltin dicarboxylate to prepare a composition, except that component (D-1) was not added and component (C) was replaced by dioctyltin dicarboxylate in an amount of 3 wt % (in terms of tin) for 100 wt % of component (A).
[Method for Evaluating the Characteristic Properties of the Cured Coating Film]
(1) Curability
The silicone composition incorporated with a catalyst was applied to PE-laminated paper at a coating weight of 1.0 g/m$^2$ (in terms of solids), and the coated paper was heated at 130° C. for 30 seconds in a circulating hot air dryer. Thus there was obtained a sample for evaluation which has a cured coating film.
The sample was rated for curability according to following criteria by observing how the cured coating film changes in surface state after rubbing with a finger.
○: no clouding after heating at 130° C. for 30 seconds
Δ: slight clouding
x: dark clouding (or remaining uncured)

(2) Adhesion

The silicone composition incorporated with a catalyst was applied to PE-laminated paper at a coating weight of 1.0 g/m$^2$ (in terms of solids), and the coated paper was heated at 150° C. for 30 seconds in a circulating hot air dryer. Thus there was obtained a sample for evaluation which has a cured coating film.

After standing at 25° C. and 50% RH for one day, the sample was rated for adhesion according to following criteria by rubbing the surface of the cured coating film with a finger and checking it for peeling.

○: no peeling at all
Δ: partial peeling
x: easy peeling (3) Releasability

The same sample as mentioned in (2) above for evaluation of adhesion was prepared. It was coated on its cured coating film with a sticking agent of acrylic solution type ("Oribain BPS-5127" from Toyo Ink Co., Ltd.). After heating at 100° C. for three minutes, the treated surface was laminated with wood-free paper having a basis weight of 64 g/m$^2$, followed by pressing (twice) under a 2 kg roll and aging at 25° C. for 20 hours. The resulting sample was cut into a 5 cm wide strip. The strip was tested for 180° peel strength on a tensile tester at a peeling rate of 0.3 m/min. The peel strength is expressed in terms of force (N) required for delamination. The tensile tester is "Autograph DCS-500" made by Shimadzu Corporation.

(4) Remaining Adhesiveness

The cured coating film (which functions as a separator) was tested for remaining adhesiveness as follows. A piece of polyester tape ("Nitto 31B" made by Nitto Denko Co., Ltd.) was stuck to the surface of the cured coating film and kept pressed under a load of 20 gf/cm$^2$ at 70° C. for 20 hours. The tape was peeled off and stuck to a stainless steel plate. The tape was peeled off at an angle of 180° with respect to the surface of the stainless steel plate at a rate of 0.3 m/min, and the force required for peeling was measured. Meanwhile, the same procedure as above was carried out except that the cured coating film was replaced by a Teflon (registered trademark) plate. The ratio of the force measured in the first testing to the force measured in the second testing was calculated. The sample was rated as good (A), poor (B), and bad (C) according to the ratio which is at least 90%, 80 to 89%, and up to 79%, respectively.

(5) Pot Life

The coating solutions prepared in Examples and Comparative Examples were checked for appearance after standing at 25° C. for one day. Those with a good appearance were rated as good (A) and those with a poor appearance (due to increased viscosity, gelation, and precipitation) were rated as bad (C).

TABLE 1

| | | Results of Evaluation | | | | |
|---|---|---|---|---|---|---|
| No. | | Curability | Adhesion | Releasability | Remaining adhesiveness | Pot life |
| Example | 1 | ○ | ○ | 0.5 | ○ | ○ |
| | 2 | ○ | ○ | 0.55 | ○ | ○ |
| | 3 | ○ | ○ | 0.49 | ○ | ○ |
| | 4 | ○ | ○ | 0.6 | ○ | ○ |
| | 5 | ○ | ○ | 0.54 | ○ | ○ |
| | 6 | ○ | ○ | 0.57 | ○ | ○ |
| | 7 | ○ | ○ | 0.51 | ○ | ○ |
| | 8 | ○ | ○ | 0.33 | ○ | ○ |
| | 9 | ○ | ○ | 0.25 | ○ | ○ |

TABLE 1-continued

| | | Results of Evaluation | | | | |
|---|---|---|---|---|---|---|
| No. | | Curability | Adhesion | Releasability | Remaining adhesiveness | Pot life |
| | 10 | ○ | ○ | 0.35 | ○ | ○ |
| | 11 | ○ | ○ | 0.3 | ○ | ○ |
| | 12 | ○ | ○ | 0.32 | ○ | ○ |
| Comparative Example | 1 | x | ○ | 2.0 | Δ | ○ |
| | 2 | x | ○ | 2.0 | Δ | ○ |
| | 3 | x | ○ | 1.2 | Δ | ○ |
| | 4 | Δ | ○ | 0.6 | ○ | x |
| | 5 | Δ | ○ | 0.3 | ○ | x |

The present invention provides a composition which, without resorting to a tin-based catalyst, forms a release paper excellent in properties of a cured coating film and also exhibits good storage stability and workability.

Example 13

First, component (A), which is 100 parts by weight of organopolysiloxane having a main skeleton composed of dimethylsiloxane units and having both ends of the molecular chain blocked with dimethylhydroxysilyl groups, characterized by that its 30 wt % solution in toluene has a viscosity of 10,000 mPa·s (measured with a rotary viscometer at 25° C.), was dissolved with stirring at 20 to 40° C. in component (E), which is 1,800 parts by weight of toluene. To the resulting solution was added components (B-1) and (D-2) with stirring at 20 to 40° C. for one hour. Component (B-1) is three parts by weight of methylhydrogenpolysiloxane composed of MeHSiO$_{2/2}$ units (95 mol %) and having both ends of the molecular chain blocked with trimethylsilyl groups, characterized by an absolute viscosity of 25 mPa·s. Component (D-2) is five parts by weight of acetylacetone.

Immediately before application to a substrate, the desired composition was prepared by incorporating the above-described mixture with component (C), which is trivalent iron triacetylacetonate, in an amount of 3 wt % in terms of iron for 100 wt % of component (A).

The thus obtained composition was uniformly applied to glassine paper by using a mayer bar, followed by curing under predetermined conditions (at 150° C. for 30 seconds). In this way there was obtained a sample for evaluation which has a coating weight of 1.0 g/m$^2$ (in terms of solids). The cured coating film was evaluated for characteristic properties according to the method mentioned above. The results of the evaluation are shown in Table 2.

Example 14

First, component (A), which is 100 parts by weight of organopolysiloxane having a main skeleton composed of dimethylsiloxane units (99.9 mol %) and hydroxymethylsiloxane units (0.01 mol %) and having both ends of the molecular chain blocked with dimethylhydroxysilyl groups, characterized by that its 30 wt % solution in toluene has a viscosity of 15,000 mPa·s (measured with a rotary viscometer at 25° C.), was dissolved with stirring at 20 to 40° C. in component (E), which is 1,800 parts by weight of toluene. To the resulting solution was added components (B-2) and (D-2) with stirring at 20 to 40° C. for one hour. Component (B-2) is five parts by weight of methylmethoxypolysiloxane having a viscosity of 10 mPa·s, which is a partial hydrolyzate condensate of MeSi(OMe)$_3$. Component (D-2) is five parts by weight of acetylacetone.

Immediately before application to a substrate, the desired composition was prepared by incorporating the above-described mixture with component (C), which is dipropoxy aluminum trivalent ethylacetoacetate, in an amount of 3 wt % in terms of aluminum for 100 wt % of component (A).

The thus obtained composition was uniformly applied to glassine paper by using a mayer bar, followed by curing under predetermined conditions (at 150° C. for 30 seconds). In this way there was obtained a sample for evaluation which has a coating weight of 1.0 g/m² (in terms of solids). The cured coating film was evaluated for characteristic properties according to the method mentioned above. The results of the evaluation are shown in Table 2.

Example 15

The same procedure as in Example 14 was carried out except that component (C) was replaced by aluminum trivalent triacetylacetonate in an amount of 3 wt % (in terms of aluminum) for 100 wt % of component (A) and component (D-2) was replaced by acetylacetone in an amount of five parts by weight.

Example 16

The same procedure as in Example 13 was carried out except that component (C) was replaced by iron trivalent octylate in an amount of 4 wt % (in terms of iron) for 100 wt % of component (A) and component (D-2) was replaced by acetylacetone in an amount of five parts by weight, and a compound represented by a formula below was further added as component (F) in an amount of five parts by weight.

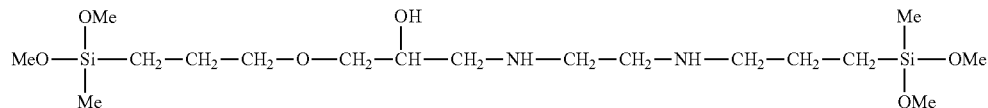 [SMILES: CO[Si](C)(CCCNCCNCC(O)COCCC[Si](C)(OC)OC)OC]

Example 17

The same procedure as in Example 14 was carried out except that component (C) was replaced by zinc divalent diacetylacetonate in an amount of 5 wt % (in terms of zinc) for 100 wt % of component (A) and component (D-2) was replaced by acetylacetone in an amount of five parts by weight, and a compound represented by a formula below was further added as component (F) in an amount of five parts by weight.

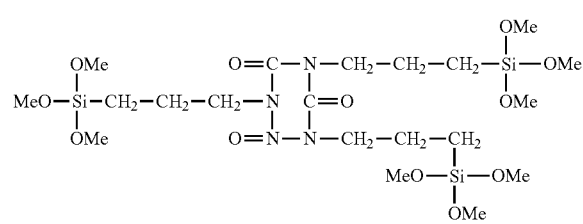

Example 18

The same procedure as in Example 14 was carried out except that component (C) was replaced by a combination of dibutoxyzirconium quadrivalent diacetylacetonate in an amount of 1.5 wt % (in terms of zirconium) for 100 wt % of component (A) and iron trivalent octylate in an amount of 1.5 wt % (in terms of iron) for 100 wt % of component (A), and component (D-2) was replaced by ethyl acetoacetate in an amount of five parts by weight.

Comparative Example 6

The same procedure as in Example 13 was carried out except that component (D-2) was not added.

Comparative Example 7

The same procedure as in Example 14 was carried out except that component (D-2) was not added.

Comparative Example 8

The same procedure as in Example 13 was carried out except that component (D-2) was not added and component (C) was replaced by dioctyltin dicarboxylate in an amount of 3 wt % in terms of tin.

TABLE 2

| | | Results of Evaluation | | | | |
|---|---|---|---|---|---|---|
| | No. | Curability | Adhesion | Releasability | Remaining adhesiveness | Pot life |
| Example | 13 | ○ | ○ | 0.35 | ○ | ○ |
| | 14 | ○ | ○ | 0.26 | ○ | ○ |

TABLE 2-continued

| | | Results of Evaluation | | | | |
|---|---|---|---|---|---|---|
| | No. | Curability | Adhesion | Releasability | Remaining adhesiveness | Pot life |
| | 15 | ○ | ○ | 0.25 | ○ | ○ |
| | 16 | ○ | ○ | 0.33 | ○ | ○ |
| | 17 | ○ | ○ | 0.32 | ○ | ○ |
| | 18 | ○ | ○ | 0.36 | ○ | ○ |
| Comparative Example | 6 | x | ○ | 1.2 | Δ | ○ |
| | 7 | x | ○ | 0.8 | Δ | ○ |
| | 8 | Δ | ○ | 0.3 | ○ | x |

The present invention provides a composition which, without resorting to a tin-based catalyst, forms a release paper excellent in properties of a cured coating film and also exhibits good storage stability and workability.

Japanese Patent Application Nos. 2011-227907 and 2011-227913 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A silicone release coating composition of condensation reaction curing type comprising:
    component (A) in an amount of 100 parts by weight which is an organopolysiloxane having at least two silanol groups in one molecule;
    component (B) which is composed of component (B-1) in an amount of 0.1 to 20 parts by weight which is an organohydrogenpolysiloxane having at least three SiH groups in one molecule, and/or component (B-2) in an amount of 0.1 to 20 parts by weight which is an organopolysiloxane having at least three hydrolyzable groups directly bonded to a silicon atom in one molecule, with component (B) being in such an amount that the number of moles of SiH groups and/or hydrolyzable groups as active groups therein is 1 to 200 times the number of moles of silanol amount in component (A);
    component (C) in a catalyst quantity which is a compound of metal selected from magnesium, aluminum, titanium, chromium, cobalt, nickel, copper, zinc, zirconium, tungsten, and bismuth, which functions as a condensation reaction catalyst;
    component (D-2) in an amount of 1 to 20 parts by weight which is a cocatalyst of an organic compound functioning as an oxygen multidentate ligand, wherein component (D-2) is any one of polybasic carboxylic acid, hydroxy acid, hydroxyketone, diketone, keto acid, and a substituted derivative thereof, which is a cocatalyst of an organic compound capable of functioning as a chelating agent; and
    component (F) in an amount of 1 to 20 parts by weight which is an organic compound having the following formula:

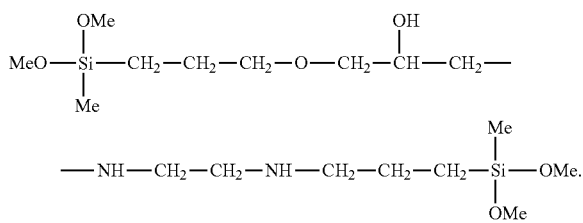

2. The composition of claim 1, wherein component (D-2) is a member selected from the group consisting of malonic acid, acetoacetic acid, acetylacetone, and substituted derivatives thereof.

3. The composition of claim 1, wherein the condensation reaction catalyst as component (C) is a compound of trivalent aluminum, trivalent cobalt, quadrivalent zirconium, or trivalent bismuth, which has an organic acid, alkoxide, or chelating agent as a ligand bonded thereto.

4. The composition of claim 1, further comprising an organic solvent as a component (E).

5. The composition of claim 1, wherein, when components (A) to (D-2) are dissolved in 1,900 parts by weight of toluene at the above-defined ranges of the blending amounts, a resulting solution has a viscosity up to twice its initial viscosity after standing at 25° C. for 24 hours.

* * * * *